United States Patent [19]

Kotoh

[11] Patent Number: 4,673,936
[45] Date of Patent: Jun. 16, 1987

[54] RESCUE TRANSMITTER APPARATUS

[75] Inventor: Keigo Kotoh, Hyogo, Japan

[73] Assignee: Mitsubishi Denki Kabushiki Kaisha, Tokyo, Japan

[21] Appl. No.: 469,600

[22] Filed: Feb. 24, 1983

[30] Foreign Application Priority Data

Feb. 26, 1982 [JP] Japan ................................. 57-31993

[51] Int. Cl.$^4$ ............................................. G01S 13/80
[52] U.S. Cl. ....................................... 342/51; 455/89; 455/100; 342/385
[58] Field of Search ......................... 343/6.5 R, 6.8 R; 455/96, 100, 89, 90, 128; 342/42, 44, 51

[56] References Cited

U.S. PATENT DOCUMENTS

| | | | |
|---|---|---|---|
| 3,513,470 | 5/1970 | Rabow | 343/6.8 R |
| 3,656,159 | 4/1972 | Kingsbury | 343/6.8 R |
| 3,728,630 | 4/1973 | Strenglein | 343/6.8 R X |
| 4,068,232 | 1/1978 | Meyers et al. | 343/6.8 R |
| 4,129,868 | 12/1978 | Tahara et al. | 343/6.8 R |
| 4,186,396 | 1/1980 | Kotoh et al. | 343/6.8 R |
| 4,331,957 | 5/1982 | Enander et al. | 343/6.8 R |

OTHER PUBLICATIONS

J. A. Meyer, "Crime Deterrent Transponder System", Jan. 1971, IEEE Trans. of Aero & Elec. Sys., pp. 1–22.

Primary Examiner—T. H. Tubbesing
Assistant Examiner—John B. Sotomayor
Attorney, Agent, or Firm—Sughrue, Mion, Zinn, Macpeak and Seas

[57] ABSTRACT

A small-size transmitting apparatus for search and rescue operation (SARTR) adapted to be worn by a user for emitting a microwave rescue signal upon a marine accident involving the user. The SARTR includes a power supply, a transmitter unit energizable by the power supply and having a microwave oscillator, a transmitting antenna receiving of a microwave output from the transmitter unit for emitting the microwave rescue signal, a case accommodating the power supply, the transmitter unit, and the transmitting antenna and attachable directly to the user's body, or mountable on clothing or the like worn by the user for being carried thereby, and a switch unit mounted in the case for controlling the emission of the microwave rescue signal.

13 Claims, 7 Drawing Figures

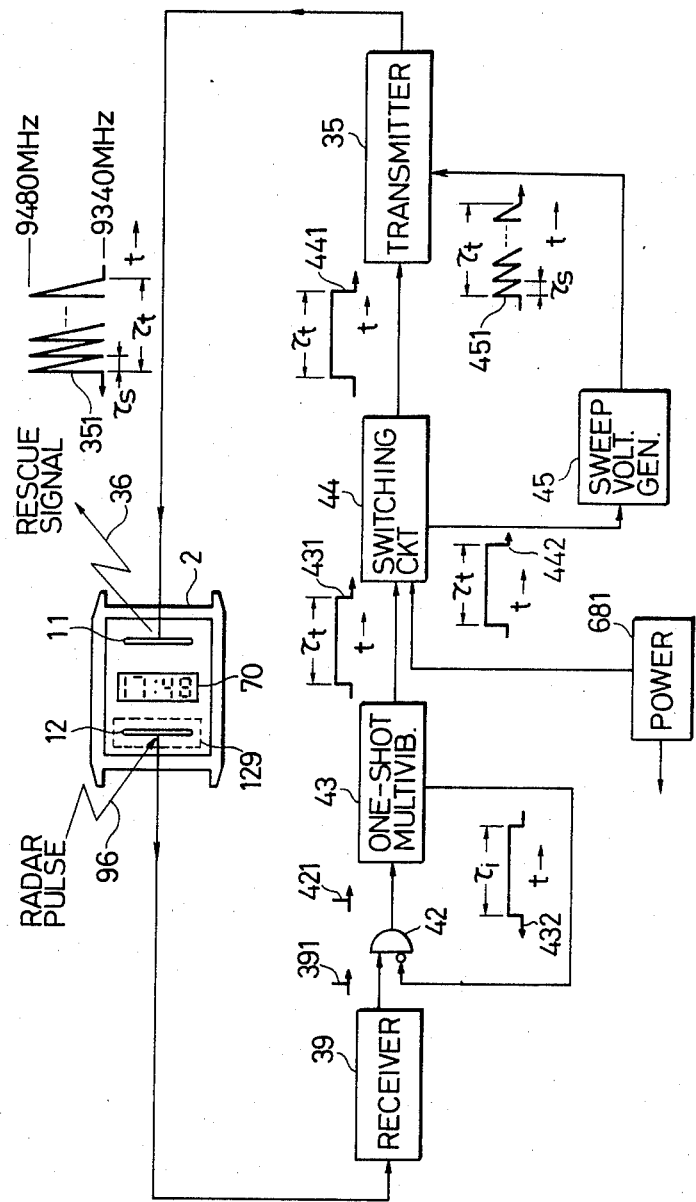

RESCUE TRANSMITTER APPARATUS

BACKGROUND OF THE INVENTION

The present invention relates to a small-size rescue transmitter apparatus for search and rescue operation (hereinafter referred to merely as an SARTR) which can be worn by a survivor in distress such as a mountain accident, a maritime accident, or an aircraft accident, for sending a distress signal indicating the survivor's position to a rescuer.

Statistics on maritime disaster indicate that more people die at sea than those who die or are lost in maritime accidents such as ship collisions. Those accidents other than maritime accidents are considered to be working accidents to maritime workers, and more than half of those dead or missing at sea due to such working accidents are killed or lost by accidentally falling from ships into the sea. There are many cases in which a crewman is found missing upon arrival at a fishing area after a fishing boat has sailed overnight. Even if an onboard crewman can recognize the accident, it is impossible for him to spot the person drifting on the sea waves in the darkness of the night.

It is considered that it would be quite helpful in saving lives if the man overboard had a means for transmitting a radiowave rescue signal to a radiowave direction finding apparatus or a marine radar device installed on the ship immediately after the accident, so that the onboard crew could recognize the occurrence of the accident, and the direction and/or position of the drifter.

There have heretofore been used an Emergency Position Indicating Radio Beacon (hereinafter referred to merely as an EPIRB) for transmitting a radiowave to enable a radiowave direction finder to indicate the occurrence of a maritime accident and the direction thereof, and large-size ships are legally required to be equipped with such EPIRB to provide against accidents on the ship. However, the EPIRB uses a 2 MHz frequency band having a wavelength of 150 m, and are so large in size and weight that they cannot be carried by a crew member himself. Even if the EPIRB were attached to the crewman, he would disturb the normal activities for the crew and it would invite other types accidents.

SUMMARY OF THE INVENTION

It is an object of the present invention to provide an SARTR which will eliminate the foregoing difficulties.

Another object of the present invention is to provide an SARTR which is capable of quickly locating a person who, for example, has accidentally fallen into the sea.

Still another object of the present invention is to provide an SARTR which can be attached directly to the body or an clothing, and which does not disturb the activities of the wearer.

An SARTR according to the present invention comprises a case mountable on the body or clothing so as to be carried thereby, a transmitter unit including a power supply and a microwave oscillator and mounted in the case, and a transmitting antenna sending of a microwave output from the transmitter unit for emitting a microwave rescue signal. The SARTR also has a switch unit that can be actuated from the exterior of the case to control the emission of the rescue signal, so that the switch unit can be turned on by the wearer to transmit the rescue signal immediately upon the occurrence of an accident.

According to a preferred embodiment of the present invention, the rescue signal transmitter further includes a receiving antenna for picking up an interrogating signal from a rescue radar, and a receiver for enabling the transmission unit to transmit the rescue signal automatically for a certain interval of time when the interrogating signal is received. The case also contains a timepiece, and can directly attached to the wearer's arm.

The above and other objects, features and advantages of the present invention will become more apparent from the following description when taken in conjunction with the accompanying drawings in which certain preferred embodiments of the present invention are shown by way of illustrative examples.

BRIEF DESCRIPTION OF THE DRAWINGS

FIG. 7 is a block diagram of a SARTR according to another embodiment of the present invention.

FIGS. 8–13 are exploded views of portions of FIG. 2.

DETAILED DESCRIPTION OF THE PREFERRED EMBODIMENTS

· The present invention will be described with reference to an application in which a rescuer is equipped with marine radar, and a survivor of a shipwreck wears on his wrist a SARTR according to an embodiment of the present invention, as incorporated in a wrist watch The marine radar uses microwaves having a main frequency band of 9 GHz (which ranges from 9,300 to 9,500 MHz and has a wavelength λ of about 32 mm) as is commonly used throughout the world. The SARTR in company with such a marine radar can therefore employ an antenna having a relatively short length l of about $\lambda/2 = 1.6$ mm for efficient radiation and reception of the microwaves.

Figure 1:
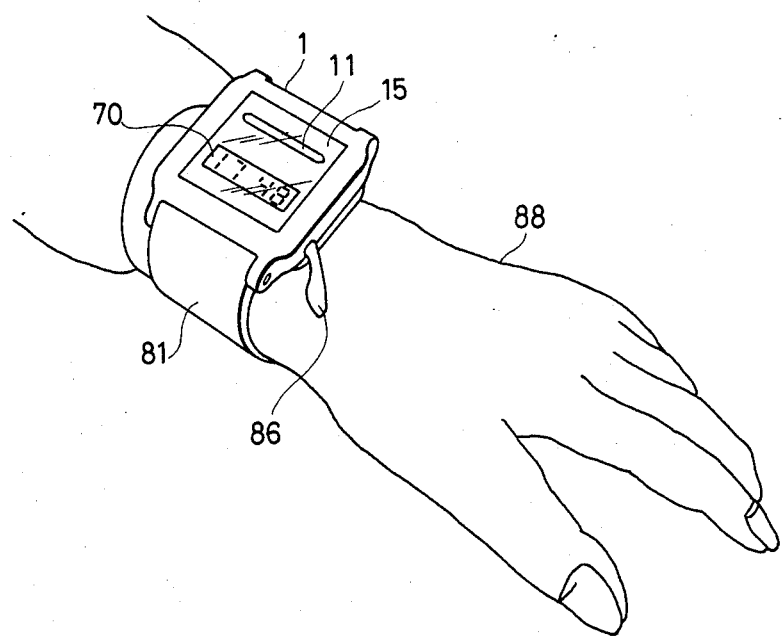
FIG. 1 is a perspective view of a SARTR according to the present invention, as attached to the wrist.

FIG. 1 shows the SARTR 1 of the invention as attached to the user's wrist, the SARTR 1 being in the form of a wrist watch and having a strap 81 for extending around the wrist 88. The SARTR 1 incorporates therein a watch 70, which, however, will not be described as it is of a known construction.

The SARTR 1 includes a transmitting antenna 11 for emitting a microwave rescue signal, the transmitting antenna 11 being in the form of a slot defined in a metal conductor covering the entire surface of the SARTR 1 and having a width of about 1.6 mm and a length of about 16 mm. Such a slot antenna cut through the metal plate has a high-frequency impedance of several hundred ohms when an electric current is fed across the center of the slot having a length of $\lambda/2$.

The transmitting antenna 1 and the watch 70 are covered with a water-resistant plate 15 made of hard glass which allows the passage of light and microwaves therethrough.

The SARTR 1 also has a switch actuator 86 of a soft synthetic resin material which the wearer of the SARTR 1 can actuate to enable the SARTR 1 to emit a microwave rescue signal. The wearer can pull the switch actuator 86 with the other hand to turn on the switch contained in the SARTR 1, whereupon electric power is supplied to a microwave integrated circuit (MIC), described later, for oscillating the microwave power for rescue signal.

Figure 2:
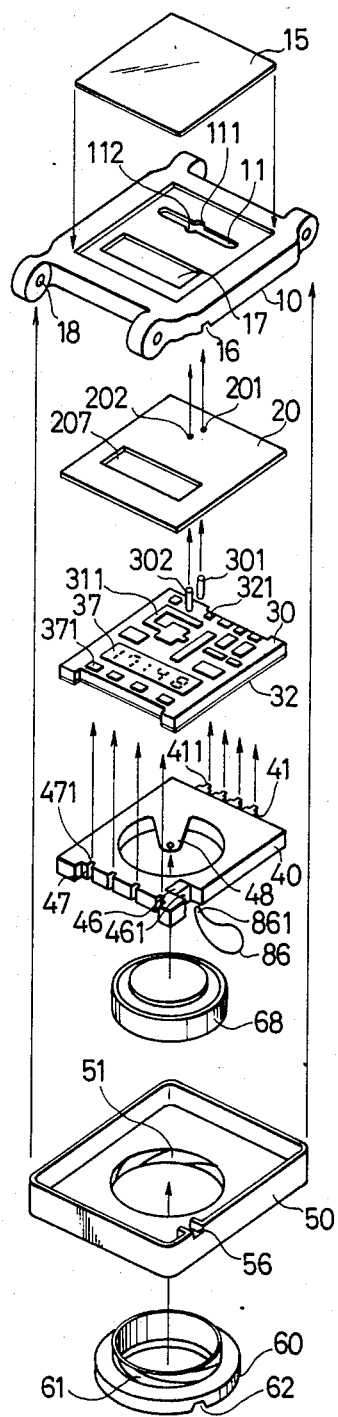
FIG. 2 is an exposed perspective view of the SARTR shown in FIG. 1.

FIG. 2 shows the SARTR in greater detail. The SARTR includes an upper case 10 of metal having the transmitting antenna 11 and a rectangular opening 17 for viewing the wrist watch. The upper case 10 has four holes 18, only three are shown, at the corners thereof for attaching the strap 81 (FIG. 1) to the upper case 10, and an upper semi-cylindrical recess 16 (shown in detail in FIG. 8). A lower case 50 also has a lower semi-cylindrical recess 56 shaped in symmetrical relation to the upper recess 16. The water-resistant plate 15 is fitted on the upper case 10 with a watertight seal. The upper case 10 includes a pair of notches 111, 112 across the longitudinal center of the antenna slot 11 for feeding microwave power to enable the antenna slot 11 to transmit a microwave rescue signal.

A microwave absorber plate 20 is interposed between the upper case 10 and the MIC 30 to serve as a microwave buffer between the upper case 10 and the MIC 30 when they are assembled close together. The microwave absorber plate 20 is made of ferrite mixed and solidified in rubber or soft synthetic resin so that it can efficiently absorb microwave although being thin. The microwave absorber plate 20 has a pair of holes 201 and 202 through which microwave output power is fed from the MIC 30 to the transmitting antenna 11 for the emission of the microwave rescue signal, and a rectangular opening 207 aligned with the opening 17 for allowing the wearer to read the time indication on the wrist watch display.

The MIC 30 serves as a microwave unit in the transmitter for producing microwave power for the rescue signal. The MIC 30 is composed of a substrate of oxidized aluminum having a thickness of 0.5 mm and an area of 25 mm×25 mm which is coated on its face and back with a metal foil conductor, the metal foil layer on the face which is visible in FIG. 2 being etched by a photochemical process to leave a microwave signal output pattern 311 as a microwave feeding circuit and terminals 321 for electric connection. The metal foil layer 32 on the back is left conductive in its entirety and is used as a ground potential (GNP) for both d.c. and microwave signals.

A liquid crystal time display 37 for the digital watch is attached to a portion of the face of the MIC 30 which is free of the pattern of the transmission of microwaves and the connector terminals. The liquid crystal time display 37 is electrically connected to watch connector terminals 371 necessary for the watch function. Since the operation of the display 37 and the digital watch is itself known, no detailed description thereof will be given here.

The microwave output pattern 311 is designed to have the same microwave impedance as that of the transmitting antenna 11. A thin feed wire 301 extends from the microwave output pattern 311. A similar feed wire 302 extends from the copper foil layer 32 on the back through the oxidized aluminum substrate. The pattern 311 and wires 301 and 302 are shown in detail in FIG. 9. These two feed wires 301, 302 extend through holes 201, 202, respectively, in the microwave absorber plate 20, and are connected to the notches 111, 112 of the transmitting antenna 11.

An electronic circuit module 40 shown in FIG. 2 is assembled as an integrated circuit chip containing a circuit for generating a sawtooth sweep voltage necessary for the operation of the transmitter, a timepiece circuit, and a power supply circuit for energizing the above circuits. The electronic circuit module 40 is molded of synthetic resin as a single body. Printed wires 41 (detailed in FIG. 10) for the transmitter and printed wires 47 (detailed in FIG. 11) for the timepiece are electrically connected to the connector terminals 321 and 371, respectively, through conductors 411 and 471.

A starter switch 46 (detailed in FIG. 12) is mounted in the module 40 for starting the operation of the transmitter to emit a microwave rescue signal, and has a slide rod 461 for opening and closing electric contacts. The switch actuator 86 is mechanically connected to the slide rod 461. The switch actuator 86 has two integrally molded watertight balls 861 which fit respectively in the semicylindrical recesses 16 and 56 in the upper and lower cases 10 and 50, when the latter are eventually put together, thereby providing a watertight seal for the case assembly. The semicylindrical recess 56 is detailed in FIG. 13. The two watertight balls both give a double watertight seal and produce suitable frictional forces which can withstand the difference between the pressure inside of the case assembly and that outside.

A power supply connector 48 extends from the molded portion of the electronic circuit module 40 for contact with the positive terminal of a cell 68 serving as a power supply.

The lower case 50 is also made of metal and can fit in the upper case 10 with a watertight seal. The lower case 50 has an internally threaded hole 51 in which there is threaded an externally threaded portion 61 of a back cover 60 of metal. The back cover 60 has a straight groove 62 which can be used to rotate the back cover 60 in fastening to the lower case 60 with a watertight seal. The back cover 60 is in the form of a cup and serves to provide d.c. connection to a negative or ground electrode of the power supply cell 68.

The upper case 10, the lower case 50 and the back cover 60 may be integrally molded of synthetic resin and electroplated with metal.

Figure 3:
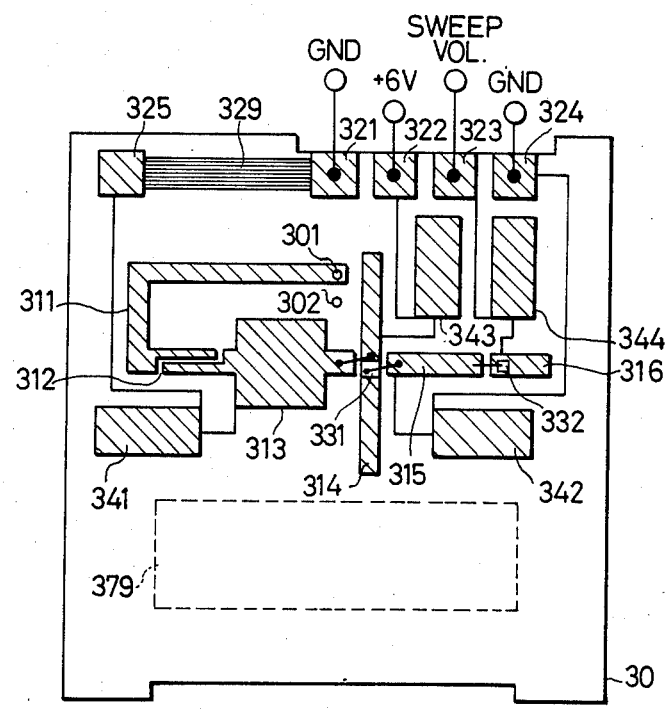
FIG. 3 is a plan view of a portion of the SARTR.

FIG. 3 shows the pattern of the MIC 30. The circuit comprises a microwave field effect transistor 331 (hereinafter referred to as a "μ-FET") and a microwave variable-capacitance diode 332 (hereinafter referred to as a "varactor"), which basically constitute an electronically tuned oscillator circuit of the type in which the drain of μ-FET 331 is grounded. The microwave output pattern 311 for the transmitter delivers a microwave transmitting power output to the slot antenna 11 (FIG. 2) through the feed wire 301.

The circuit of FIG. 3 includes a matching pattern 313 which serves to provide impedance matching between the oscillator circuit and the microwave output pattern 311. A gap 312 defined between the output pattern 311 and the matching pattern 313 serves to cut off a d.c. component in the bias voltage for the source of the μ-FET 331.

An inductance pattern 314 produces an inductance for feedback for oscillation. The drain of the μ-FET 331 is mounted on the inductance pattern 314. The inductance pattern 314 is supplied with a d.c. voltage of +6 V from a connector terminal 322 when the switch 46 is turned on by the wearer.

The source of the μ-FET 331 is connected by a thin wire to an end of the matching pattern 313, and the gate thereof is connected by a thin wire to a resonance pattern 315. The source of the μ-FET 311 is supplied with a bias voltage by a resistor 329 printed between a relay pattern 325 and the connector terminal 321 which is grounded. To one end of the resonance pattern 315 is connected, by a thin wire, the anode of the varactor 332. The resonance pattern 315 is grounded through a connector terminal 324.

A tuning pattern 316 has a length of about λ/4 and has a terminating end in terms of the microwave. On the opposite end thereof, there is mounted the cathode of the varactor 332. The tuning pattern 316 is supplied with a sawtooth sweep voltage from a connector terminal 323 for electronic tuning.

Choke patterns 341, 342, 343, and 344 are connected between the above patterns and the connector terminals of preventing the influx of microwave into the corner terminals. The time display of the timepiece is located at a position 379.

Figure 4:
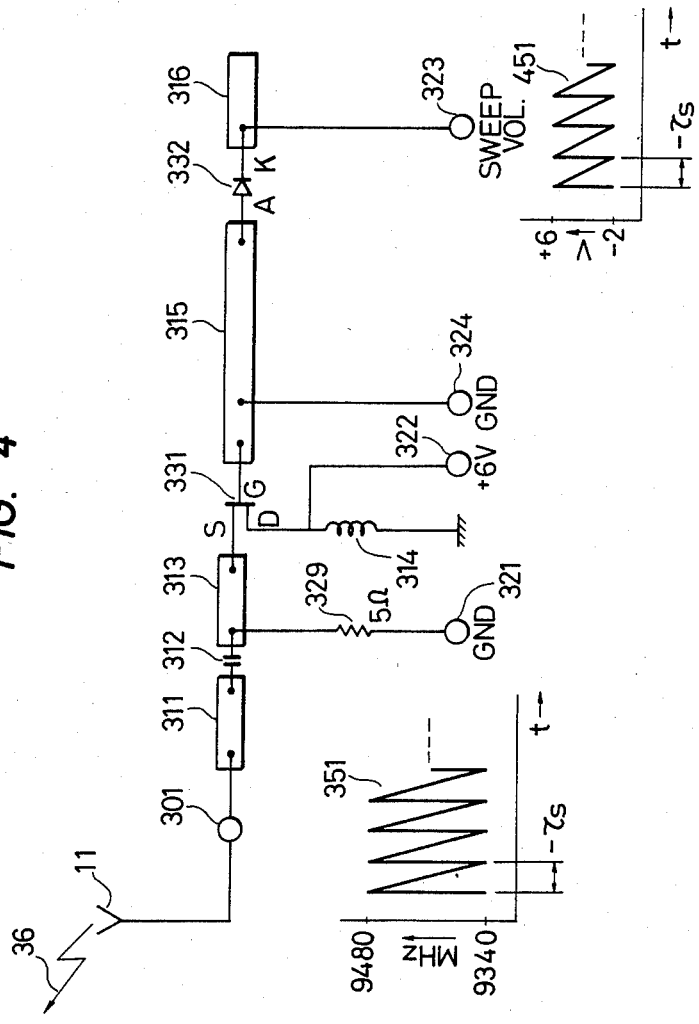
FIG. 4 is an equivalent electric circuit of the portion shown in FIG. 3.

FIG. 4 is an equivalent electronic circuit of the distributed constant circuit shown in FIG. 3. Corresponding parts are denoted by corresponding reference characters in FIGS. 3 and 4. When a voltage of +6 V is applied to the connector terminal 322, and a sawtooth sweep voltage 451 having a period τs with respect to time t as shown in FIG. 4 is applied to the connector terminal 323, the feed wire 301 is supplied, due to drain-grounded electronically tuned oscillation, with a microwave transmission output 351 with a rectilinear sweep at a frequency τs. The microwave transmission output 351 is then radiated as a microwave rescue signal 36 into space from the slot antenna 11.

Figure 5:
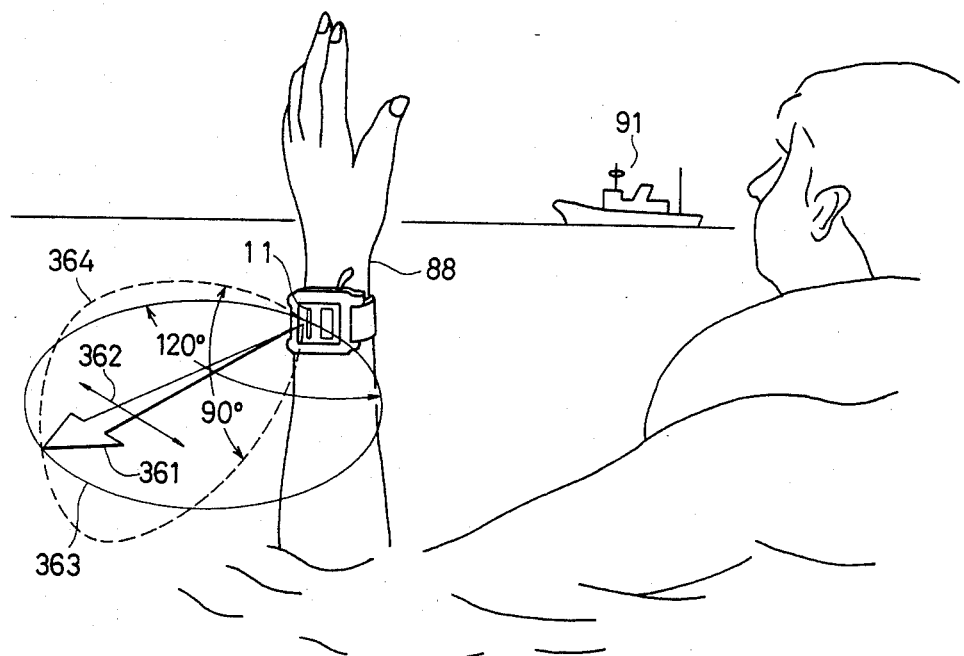
FIG. 5 is a perspective view illustrative of the radiative patterns of rescue signals in which a rescue signal is transmitted from the SARTR to a radar of FIG. 1 in actual use.

FIG. 5 illustrates the radiative patterns in which the microwave rescue signal is transmitted from the SARTR on the wrist 88 of a survivor of a marine accident, when the wrist is held vertically. The main beam radiated from the transmitting antenna 11 is directed as shown by an arrow 361. With the slot antenna, the E and H planes of the radiated microwave are reversed with respect to a dipole antenna, and hence the plane of polarization is horizontal as shown at 362, aligned with that of a radar antenna 91 on a rescue ship. The directionality of the radiated microwave rescue signal is about 120 degrees in a horizontal plane 363 and about 90 degrees in a vertical plane 364 at a half-amplitude point at which the microwave power is half that for the main beam.

Moreover because of the conductive planes around the antenna are spread widely by the body effect of the arm, therefore the radiation efficiency of the antenna will be improved.

In FIG. 5, the direction 361 of the main beam of the microwave rescue signal emitted from the SARTR is shown as being opposite that toward the radar antenna 91 on the rescue ship, and theoretically the radar antenna 91 fails to receive the radiowave transmitted from the SARTR. However, when the person is within a close distance, the microwave rescue signal is reflected by wave surface, etc. in the vicinity of the transmitting antenna 11 and can be received by the radar since signal proportion is rendered possible between the antenna 11 and the radar antenna 91, in all probability, taking into account the varying plane of polarization due to movements of the wrist above the sea surface.

Assuming that the transmitter has a microwave output Pt, the wavelength used in λ, the gain of the transmitting antenna 11 is Gt, the power loss caused when the power is sent from the MIC 30 to the antenna 11 is Lt, and the distance from the survivor to the rescue ship is R, the intensity of $P_r$ of the microwave rescue signal received from the SARTR by the radar antenna 91 can be expressed as follows:

$$P_r = Pt + Gt = Lt - 10 \log\left(\frac{4\pi R}{\lambda}\right)^2 \quad (1)$$

When the intensity $P_r$ is larger than the overall receiving sensitivity $S_r$ of the radar including the gain of the radar antenna, an image resulting from the microwave rescue signal radiated by the SARTR can be displayed on a cathode-ray tube of a plan position indicator of the radar.

Where the microwave output Pt from the MIC 30 is 10 mW (10 dBm) taking into consideration the limitation in the capacity of the small power supply cell, the intensity $P_r$ at R=100 m is given by the following, if the antenna gain of the SARTR Gt=2 dB, the power loss Lt=1 dB, and the wavelength used λ=0.032 m (9.375 MHz):

$$P_{rcx} = 10 + 2 - 1 - 10 \log\left(\frac{4\pi \times 100}{0.032}\right)^2 \quad (1')$$

Since the overall receiving sensitivity $S_r$ of the marine radar is normally in the range of −90 to −100 dBm, $PL_{rcx}$ is larger than $S_r$ when the main beam of the rescue signal radiowave is directed toward the radar antenna, so that the survivor can be reliably spotted by the radar on the rescue ship. Where a radar of high receiving sensitivity with S=−100 dBm is used, anyone within a radius of about 900 m can be detected if the microwave output Pt is 10 mW. With the microwave output Pt increased to 100 mW, the radar can cover a radius of about 2,700 m (1.7 nautical miles).

Figure 6:
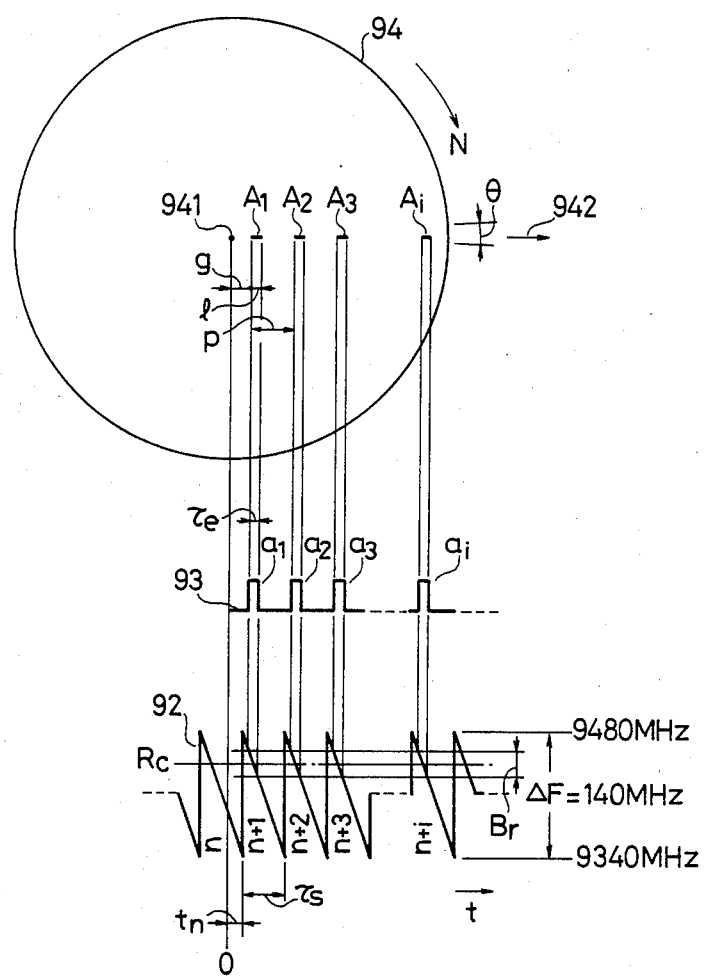
FIG. 6 is a schemative diagram showing an image on a cathode-ray tube of a plan position indicator of a radar and waveforms of the displayed signals by a SARTR.

FIG. 6 shows an image as displayed on the cathode-ray tube 94 of the plane position indicator (PPI) of the radar when it receives a microwave rescue signal from the SARTR with $P_r$ greater $S_r$. A microwave rescue signal 92 illustrated by way of example is rectilinearly frequency-swept in the range of 9,340 to 9,480 MHz at a period τs. When a radar receiver having a central frequency Rc and a band width Br as received receives the (n+1)th to (n+i)th pulses of the microwave rescue signal 92, the radar detects a train of pulses $a_1$–$a_i$ having an equal pulses width τe and a period τs, and the cathode-ray tube 94 of the plane position indicator displays a series of lines $A_1$–$A_i$.

The cathode-ray tube 94 has a center 941 which corresponds to the position of the rescue ship, and the direction 942 in which the series of lines $A_1$–$A_i$ is arranged is indicative of the orientation of the survivor as viewed from the rescue ship, that is, the direction from which the microwave rescue signal comes. These features are well known radar principles, and hence will not be described in more detail.

Each of the lines $A_1$–$A_i$ has a length l extending radially of the cathode-ray tube 94, and is longer the greater the pulse width $\tau e$. The pulse width $\tau e$ can be expressed by the following equation:

$$\tau e = \frac{Br \times \tau s}{\Delta F} \quad (2)$$

Where $\Delta F$ is the width of frequency sweep of the received microwave rescue signal 92. With the microwave rescue signal as shown in FIG. 6, $\Delta F = 9,480 - 9,340 = 140$ MHz, and the repetitive period s of the frequency sweep is $\tau s$. Assuming that $\tau s = 5 \mu s$ and the reception band width of the radar $Br = 20$ MHz, the pulse width $\tau eex$ is as follows:

$$\tau eex = \frac{20 \times 5}{140} \doteq 0.7 \mu s \quad (2')$$

The length 1 $\mu S$ on the cathode-ray tube 94 corresponds to an actual distance of 150 m, so that the radial length of each line $A_1$ to $A_i$ corresponds to 0.7 $\mu s \times 150$ m$\simeq 100$ m.

The actual length l of each line displayed on the cathode-ray tube is given by:

$$l = r \times \frac{150 \times \tau e}{Or} + lo \quad (3)$$

where r is the radius of the cathode-ray tube, Or is the radius covered (observation range) by the radar, and lo is the diameter of the minimum electron beam spot on the cathode-ray tube available when the electron beam converges, the minimum spot diameter being normally on the order of 0.5 mm. When a twelve-inch cathode-ray tube having a radius of 139.5 mm is used with a radar covering a radius of 3 nautical miles = 5,556 m, the length of lex of each line on the cathode-ray tube is derived from equation (3) as follows:

$$lex = 139.5 \times \frac{150 \times 0.7}{5,556} + 0.5 \approx 3.1 \text{ mm} \quad (3')$$

Likewise, the pitch p of the repetition of the lines $A_1$ to $A_i$ can be expressed by the following equation:

$$p = r \times \frac{150 \times \tau s}{Or} \quad (4)$$

When $\tau s = 5 \mu S$ and $Or = 5,556$ m, $$P_{ex} = 139.5 \times \frac{150 \times 5}{5,556} \approx 18.8 \text{ mm} \quad (4')$$

With the twelve-inch cathode-ray tube covering a raduis of 3 nautical miles, the radar is responsive to the microwave rescue signal 92 received for displaying a series of lines $A_1$ to $A_7$ each having a radial length lex = 3.1 mm at a pitch p = 18.8 mm, the number of lines displayed being $I = r/p = 139.5/18.8 \simeq 7$. The displayed lines are however low in brightness as they are displayed by an electron beam which impinges on the fluorescent screen of the cathode-ray tube only once.

The first line $A_1$ is spaced from the center of the cathode-ray tube 94 by a gap g which is determined by a reference time point O dependent upon the pulses transmitted by the radar, and by the frequency sweep of the received microwave rescue signal 92 upon arrival at the radar. Since the radar and the SARTR are not in synchronous relation, the gap tn between the boundary line between the nth and the (n+1)th pulses and the reference time point O varies to a maximum extent of $\tau s$. Thus, the displayed lines $A_1$ to $A_7$ with their starting point determined by the gap g become displayed randomly in the radial direction of the cathode-ray tube in the range of 0 to $\tau s$ (= 18.8 mm).

Designated at $\theta$ in FIG. 6 is a half-amplitude level of the directivity of the main beam from the radar antenna. As the radar antenna scans or rotates N times, and the radar receiver operates intermittently in synchronism with the radar pulses, the cathode-ray tube repeatedly displays a succession of lines $A'_1 - A'_i$, $A''_1 - A''_i$, ... h times as the lines are slightly angularly displayed in the circumferential direction of the cathode-ray tube within the angular interval $\theta$ as long as $P_r$ is larger than $S_r$. The number of hits h of repetitions of display of the series of lines can be expressed by the following equation:

$$h = \frac{fr \times \theta}{6N} \quad (5)$$

where fr is the frequency of repetition of the radar pulses which determines the point at which the intermittent operation of the radar receiver starts, or the reference time point O, the frequency fr being normally in the range of 400 to 2,400 pps. The half-amplitude level $\theta$ of the directivity of the main beam of the radar antenna ranges of 1 to 2 degrees, and the value N of the rotation of the radar antenna is in the range of 10 to 20 rpm. When fr = 1,000 pps, $\theta = 2$ degrees, and N = 10 rpm, $$h = \frac{1,000 \times 2}{6 \times 10} \approx 33 \quad (5')$$

Therefore, 33 hits of lines are displayed one after another as they are slightly displayed in the circumferential direction of the cathode-ray tube. As described above, the 33 hits of lines as they are displayed become shifted by the interval $\tau s$ at random radially of the cathode-ray tube, with the result that no integrating effect is available on the fluorescent screen, and hence the image on the cathode-ray tube is of low brightness.

Accordingly, the image displayed on the plan position indicator of the radar on the rescue ship in response to the microwave rescue signal takes the shape of a less bright bar as if drawn by a brush, the displayed bar extending from the center of the cathode-ray tube in the direction toward the survivor and having width $\theta$ at the outer periphery of the cathode-ray tube.

According to another embodiment of the present invention, a simple receiver may be added to the SARTR described above to provide a transponder which operates in synchronism with radar pulses to transmit the microwave rescue signal. With such a transponder, the rescue signal 92 received by the radar is held in synchronism with the intermittent reception by the radar, and hence the gap g in FIG. 6 is kept constant. Since the lines are repeatedly displayed on the cathode-ray tube and are equally spaced in the radial direction of the cathode-ray tube, they are superimposed while being shifted circumferentially of the cathode-ray tube. The superimposed lines appear as highly bright dots due to the integrating effect of an afterimage on the fluorescent screen, the lines having a length l, a width $\theta$, and a pitch p.

Where the transponder transmits a microwave rescue signal for a time interval of $\tau t = 100 \mu s$ per radar pulse received, with the signal being frequency-swept every $\tau s = 5$ μs as with the microwave rescue signal received by the radar illustrated in FIG. 6, the radar receives a train 93 of pulses $a_1 = a_{20}$, as $\tau t/\tau s = 20$. When the radar covers a radius Or greater than 8 nautical miles, a total of twenty bright dots are displayed on the cathode-ray tube at displayed intervals corresponding to 0.4 nautical miles $(=\tau s)$ over a total length corresponding to 8 nautical miles $(=\tau t)$. The transponder is advantageous over the above descripbed SARTR which continuously transmits a microwave rescue signal, in that the transponder transmits a microwave rescue signal for a short period of time $(\tau t)$ which has been selected in advance, and hence greatly reduces the power consumption.

FIG. 7 is a block diagram of such a transponder, illustrating the appearance of the transponder 2, which is similar to that shown in FIG. 2. Like or corresponding parts in FIG. 7 are denoted by like or corresponding reference characters in the other figures. The transponder 2 includes a transmitting antenna 11 which has the same characteristics and structure as the transmitting antenna shown in FIG. 2, a receiving antenna 12 identical in characteristics and structure to the transmitting antenna 11, and a digital watch 70 which is the same as the watch shown in FIG. 2.

The transponder does not generally transmit a microwave rescue signal unless it receives a interrogating signal from another souce, and consumes most of the electric power from the power supply for its transmitter. Therefore, the receiver may be designed such that it will consume a reduced amount of power equal to or smaller than that consumed by the timepiece, and may be connected to the power supply at all times. An incoming interrogating signal may then be prevented from being received by the receiving antenna by a structure which can serve as a start switch for the transponder when removed. Such a structure comprises a starter cover placed at a position 129 shown in FIG. 7. The starter cover is made of a thin sheet of synthetic resin containing therein a material such as a metal foil which prevents radar's interrogating pulse from passing therethrough. When the starter cover is mechanically set on the outer surface of the transponder over the receiving slot antenna 12 for microwave reception, it blocks radar pulses 96 against reception by the slot antenna 12. Therefore, when the wearer of the transponder removes the starter cover, the transponder starts operating. The starter cover also serves to protect a detector diode in the receiver of the transponder against intensive radar pulses from a closely located radar under normal conditions when the device is not being used.

As shown in FIG. 7, the transponder includes a receiver 39 which can reliably be put into operation regardless of the simple direct detection process employed which utilizes detector diode since radar interrogating pulses are powerfull levels. The receiver is composed of a printed distributed constant circuit comprising such a detector diode which replaces the varactor 332 shown in FIG. 3, a tuning pattern 316 and a choke pattern 344 which are the same as those shown in FIG. 3, and a signal input pattern having the same impedance as that of the receiving antenna and replacing the resonance pattern 315. The printed patterns for the receiver can be accommodated on a printed circuit substrate which is of about the same size as that of MIC 30. The receiver of the direct detection type is supplied with a d.c. bias voltage for diode detection, instead of a sweep voltage, through a connector terminal corresponding to the connector terminal 323 shown in FIG. 3. The receiver is connected to the receiving antenna by the same connection arrangement as that by which the MIC 30 is connected to the transmitting antenna as illustrated in FIG. 2.

A radar pulse received by the transponder is directly detected by the receiver 39 (FIG. 7) and is converted thereby into a trigger pulse 391, which passes through an inhibit gate 42 and then is supplied as a gate trigger pulse 421 to a one-shot multivibrator 43. The one-shot multivibrator 43 produces a transmission gate pulse 431 having $\tau t = B$ 100 μs and a reception inhibit pulse 432 having $\tau i = 105$ μs, i.e., slightly longer than $\tau s$, these two outputs being in synchronism with the radar pulse. The reception inhibit pulse is fed back to the inhibit gate 42 to de-energize the receiver system in the transponder for the interval $\tau i$. This reception inhibit operation is necessary to prevent random reception from a plurality of radars for reliable transmitting operation and also to prevent free running due to reception by the reception antenna 12 of a microwave rescue signal emitted from the transmitting antenna 11.

The transmission gate pulse 431 is delievered to a switching circuit 44 to switch electric power from a power supply 681 to either a transmitter 35 or to a sweep voltage generator circuit 45 for the transmitting operation. The power 441 for the transmitter 35 is supplied to the drain of the μ-FET in the transmitter 35 composed of the distributed constant circuit pattern which is of the same construction as that shown in FIG. 3. Thus, with reference to FIG. 3, a voltage of 6 V is supplied to the connector terminal 322 for the interval $\tau t$. The sweep power 442 shown in FIG. 7 is supplied to the sweep voltage generator circuit 45, which then produces a sawtooth sweep voltage 451 that repeats every $\tau s$ during the interval $\tau t$. The sweep voltage is applied to the varactor in the transmitter 35. With reference to FIG. 3, therefore, the sweep voltaga 451 is applied to the connector terminal 323 for the interval $\tau t$.

The transmitter 35 generates a microwave transmission output 351 for the interval $\tau t$, which is rectilinearly frequentcy-swept every $\tau s$ in the range of 9,340 to 9,480 MHz. The microwave transmitting output 351 is then emitted as a microwave rescue signal 36 from the transmitting antenna 11. The emission of the microwave rescue signal is repeated for the number of times determined by equation (5) each time the transponder receives a interrogating pulse transmitted by the radar. Since the rectilinear frequency sweep in the microwave rescue signal is kept in synchronism with the intermittent operation of the radar receiver based on the radar interrogating pulses received, the gap g as shown in FIG. 6 becomes constant as described above, and a train of dots which are hightly bright are displayed on the cathode-ray tube of the plane position indicator of the radar of the rescue ship to indicate the orientation of the accident victim as viewed from the rescue ship.

The microwave rescue signal transmitted from the SARTR according to the embodiments of the present invention can be received by any radar of the 9 GHz band with no modification whatsoever required thereto as long as $P_{rex}$ is greater than Sr.

The train of pulses derived by the radar from the microwave rescue signal is regular in repetitive frequency and amplitude as shown at 93 in FIG. 6, and varies greatly from random trains of pulses normally received by the radar due to radar echoes as reflected from ships and another target. The SARTR of the present invention can therefore operate more efficiently by adding to the radar an automatic alarm device for analyzing a video signal at a video output terminal of the plane position indicator and for energizing a buzzer when the video output is found to be regularly repetitive at intervals τs.

The automatic alarm device is of a relatively simple construction, composed of a video analyzer for determining whether the video output signal is a succession of multiple pulses appearing every τs, and an acoustic circuit for producing a buzzer sound in response to the detection of such a video output signal.

When the crewmen of a ship equipped with a radar having the automatic alarm device carry SARTR, respectively, at all times, and when one of the crew members has fallen into the sea, the other members can be made aware of the accident from the buzzer sound generated by the automatic alarm device, so that they can initiate a search and rescue action while viewing the cathode-ray display tube.

As described above, the SARTR of the present invention comprises a case which is so small in size that it can be attached directly to a person's wrist or installed on clothes or gear such as a helmet, and a switch unit mounted in the case and containing all of the electronic circuits including an antenna necessary to generate a microwave rescue signal, the switch unit being actuatable from the exterior for controlling rescue signal emission. With this arrangement, the SARTR can be carried by personnel at all times without disturbing their activities, and can generate a microwave rescue signal immediately when an accident occurs to inform the rescuer of the accident and the position thereof without fail.

The microwave of the 9 GHz band generated by the SARTR can also be picked up by the weather/mapping radars on aircraft, which use the same frequency band throughout the world. Therefore, the SARTR, with its transmission output being increased, can be used in the rescue of aircraft pilots, for example.

Although certain preferred embodiments have been shown and described in detail, it should be understood that many changes and modifications may be made therein without departing from the scope of the appended claims.

What is claimed is:

1. A rescue transmitter apparatus for emitting a microwave rescue signal upon the occurrence of an accident, comprising:
   a power supply unit,
   a transmitter unit energizable by said, power supply unit and including a microwave oscillator,
   a transmitting antenna receptive of a microwave output from said transmitter unit for emitting the microwave rescue signal,
   a case accommodating said power supply unit, said transmitter unit, and said transmitting antenna and being of a size so as to be attachable to a human body or mountable on clothing for being carried thereby, and
   a switch unit mounted in said case for controlling the emission of said rescue signal,
   wherein said transmitter unit and said receiver are constructed as flat boards, and
   said apparatus further comprises a flat board microwave absorber sandwiched between said transmitter unit and said transmitting antenna.

2. The apparatus according to claim 1 further comprising; a receiving antenna for picking up an interrogating signal, and a receiver for receiving the interrogating signal from the receiving antenna, wherein said transmitter unit is energizable to cause said transmitting antenna to emit said rescue signal for a predetermined interval of time when the interrogating signal is received by said receiver.

3. The apparatus according to claim 1 wherein said rescue transmitter apparatus is directly attached to the human body to thereby improve deterioration in transmitting and receiving efficiency of said antenna due to reduction in conductor area.

4. The apparatus according to claim 1 wherein said switch unit is actuatable from the exterior of said case.

5. The apparatus according to claim 2 wherein said switch unit comprises a starter cover mechanically mounted over said receiving antenna for blocking said interrogating signal against receiving by said receiving antenna, said starter cover being removable for initiating emission of the microwave rescue signal by said transmitting antenna.

6. The apparatus according to claim 4 wherein said switch unit comprises a starter cover mechanically mounted over said receiving antenna for blocking said interrogating signal against receiving by said receiving antenna, said starter cover being removable for initiating emission of the microwave rescue signal by said transmitting antenna.

7. The apparatus according to claim 1 further comprising a timepiece contained in said case.

8. The apparatus according to claim 1 wherein said case is provided with a wrist strap for direct attachment to the arm of a wearer.

9. The apparatus according to claim 1 wherein said case comprises a pendant which can hang from the neck of the wearer.

10. The apparatus according to claim 1 wherein said case is incorporated in a life jacket.

11. The apparatus according to claim 1 wherein said transmitting unit constitutes a microwave unit constructed as a microwave integrated circuit.

12. The apparatus according to claim 1 wherein said transmission antenna and said reception antenna each comprises a slot antenna having a length equal to one-half the wavelength of the microwave signal.

13. The apparatus according to claim 2, wherein said transmitter unit and said receiver are constructed as a microwave integrated circuit, and said transmitting antenna and said receiving antenna each comprises a slot antenna.

* * * * *